application NO

United States Patent
Lyon et al.

(10) Patent No.: US 11,584,874 B2
(45) Date of Patent: Feb. 21, 2023

(54) INCREASED SATURATION OF ICE MELTING COMPOSITIONS AND METHODS OF USE

(71) Applicant: BASF SE, Ludwigshafen am Rhein (DE)

(72) Inventors: Matthew Gerard Lyon, Wyandotte, MI (US); John Andrew Randolph, Wyandotte, MI (US); Michael Capracotta, Wyandotte, MI (US); Joseph P Borst, Wyandotte, MI (US)

(73) Assignee: BASF SE, Ludwigshafen am Rhein (DE)

( * ) Notice: Subject to any disclaimer, the term of this patent is extended or adjusted under 35 U.S.C. 154(b) by 38 days.

(21) Appl. No.: 16/961,960

(22) PCT Filed: Jan. 10, 2019

(86) PCT No.: PCT/EP2019/050473
§ 371 (c)(1),
(2) Date: Jul. 14, 2020

(87) PCT Pub. No.: WO2019/141568
PCT Pub. Date: Jul. 25, 2019

(65) Prior Publication Data
US 2020/0339851 A1     Oct. 29, 2020

Related U.S. Application Data

(60) Provisional application No. 62/618,877, filed on Jan. 18, 2018.

(51) Int. Cl.
*C09K 3/18*     (2006.01)
(52) U.S. Cl.
CPC .............. *C09K 3/185* (2013.01); *C09K 3/18* (2013.01); *Y02P 20/54* (2015.11)
(58) Field of Classification Search
CPC ............ C09K 3/185; C09K 3/18; Y02P 20/54
See application file for complete search history.

(56) References Cited

U.S. PATENT DOCUMENTS

2012/0193569 A1 * 8/2012 Koefod ................ C09K 3/185
                                                        252/70

FOREIGN PATENT DOCUMENTS

| CN | 104862709 A |   | 8/2015 |
|----|-------------|---|--------|
| CN | 107083234 A | * | 8/2017 |
| CN | 107129874 A | * | 9/2017 |
| CN | 107129874 A |   | 9/2017 |

OTHER PUBLICATIONS

English translation of CN 107129874 A via WIPO translate. (Year: 2017).*
Smith, E. L., Abbott, A. P., & Ryder, K. S. (2014). Deep eutectic solvents (DESs) and their applications. Chemical reviews, 114(21), 11060-11082. (Year: 2014).*
CN-107083234-A, machine translation (Year: 2017).*
CN-107129874-A, machine translation (Year: 2017).*
Ionic Liquid Chemicals [retrieved from the internet at Apr. 11, 2022 <URL: http://ionicliquidchemicals.com/English/Product/Players/>] (Year: 2016).*
Wasserscheid, Peter, and Wilhelm Keim. "Ionic liquids—new "solutions" for transition metal catalysis." Angewandte Chemie International Edition 39.21 (2000): 3772-3789. (Year: 2000).*
Smith, et al., "Deep Eutectic Solvents (DESs) and Their Applications", Chemical Reviews, vol. 114, Issue 21, Oct. 10, 2014, pp. 11060-11082.
International Search Report and Written Opinion for corresponding PCT/EP2019/050473 dated May 23, 2019, 15 pages.
Wasserscheid, et al., "Ionic Liquids—New "Solutions" for Transition Metal Catalysis", Angewandte Chemie, Oct. 27, 2000, pp. 3772-3789, 39(21).

* cited by examiner

*Primary Examiner* — Kevin E Yoon
*Assistant Examiner* — Marites A Guino-o Uzzle
(74) *Attorney, Agent, or Firm* — Armstrong Teasdale LLP

(57) ABSTRACT

Described herein is an ice melting composition that includes at least one solvent, at least one deicing agent, and at least one additive. Possible additives include ionic liquids, deep eutectic solvents, dispersants and combinations thereof. The composition exhibits an increased saturation point due to the addition of the additives thereby reducing or eliminating precipitation of the deicing agent at low temperatures. Also described herein are methods of melting ice or preventing ice from forming on a surface. The methods include applying the ice melting composition to the surface either before or after ice forms.

12 Claims, No Drawings

INCREASED SATURATION OF ICE MELTING COMPOSITIONS AND METHODS OF USE

CROSS-REFERENCE TO RELATED APPLICATIONS

This application is a U.S. National Phase Application of PCT/EP2019/050473, filed Jan. 10, 2019, which claims the benefit of priority to U.S. Provisional Patent Application 62/618,877, filed Jan. 18, 2018, the entire contents of which are hereby incorporated by reference herein.

BACKGROUND OF THE DISCLOSURE a. Field of the Disclosure

Embodiments of the present disclosure relate generally to the preparation and use of ice melting compositions. More specifically, the present disclosure is directed to an aqueous ice melting composition that comprises a deicing agent and at least one additive selected from the group consisting of ionic liquids, deep eutectic solvents, dispersants and combinations thereof. These ice melting compositions have an increased saturation point for the deicing agent as comparted to a similar composition without the additive thereby reducing or eliminating precipitation of the deicing agent in the solution at low temperatures.

b. Background Art

Wintry conditions create a hazard on roads in the form of snow and ice. Eliminating snow and ice on roads and highways has significant public safety benefits. Sodium chloride (NaCl) and magnesium chloride ($MgCl_2$) are often used to inhibit snow and ice formation on roadways and sidewalks. These salts work as deicing agents by dissolving into the precipitation and lowering the freezing point of the water, thereby melting the ice and snow.

Deicing solutions generally have a high concentration of dissolved salts (~30 wt. %). Because they are so concentrated, when stored below freezing temperatures, precipitation of the dissolved salt can potentially be an issue. The magnesium chloride ($MgCl_2$) used in these deicing solutions may be mined as bischofite ($MgCl_2 \cdot 6H_2O$), which has naturally occurring impurities including magnesium sulfate ($MgSO_4$). Because $MgSO_4$ is less soluble than $MgCl_2$, it precipitates first, thereby creating nucleation sites for the $MgCl_2$. When these compounds precipitate out of solution, it can dog spray nozzles and damage application equipment.

During the application of a deicing solution on roadways, the tanker trucks are exposed to below freezing temperatures. This may result in solids forming which is a problem as the spray nozzles are small and prone to clogging. The current method of removal is through physically removing the solids, which is both labor and time intensive. Currently methods for reducing salt crystallization involve the addition of a dispersant polymer to the salt solution. Typical dispersant polymers include polyacrylates and polyvinylpyrrolidone. Thus there is a need to prepare a highly concentrated salt solution for deicing that reduces or eliminates precipitation of the dissolved deicing agent at low temperatures.

The problem of damage to roadways and highways because of the expansion and contraction of water or water-based solutions during freezing and thawing cycles has become an even bigger issue since the introduction of highly porous asphalt. It may comprise up to 20% of hollow or void space and has the advantage that rain and melt water will flow away quickly from the asphalt surface through subsurface channels into the soil. The road surface itself retains practically no moisture and is not slick and slippery even during heavy rainfall. While the use of this type of asphalt has an enormous beneficial effect on safety under rainy conditions, a disadvantage is that under wintry conditions more of the deicing agent is needed in order to keep the roads free of snow and ice. The deicing agent can also flow away from the road surface with the melt water. Thus there is a need to prepare an effective ice melting composition to reduce damage caused by repeated freeze/thaw cycles in cold weather.

SUMMARY OF THE DISCLOSURE

Disclosed herein is an ice melting composition that includes at least one solvent, at least one deicing agent, and at least one additive selected from the group consisting of ionic liquids, deep eutectic solvents, dispersants, and combinations thereof. The composition exhibits an increased saturation point due to the addition of the at least one additive thereby inhibiting precipitation of the deicing agent at lower temperatures. Also disclosed herein are methods of melting ice or preventing ice from forming on a surface. The method includes applying the ice melting composition to the surface either before or after ice forms.

In one embodiment, the present disclosure is directed to an ice melting composition that comprises: at least one solvent; from 0.01 to about 55 wt. % of at least one deicing agent; and from 0.01 to about 25 wt. % of at least one additive selected from the group consisting of ionic liquids, deep eutectic solvents, dispersants, and combinations thereof.

In another embodiment, the present disclosure is directed to a method for melting ice on a surface. The method comprises: (i) applying an ice melting composition to the surface after ice has formed, wherein the ice melting composition comprises: (a) at least one solvent; (b) from 0.01 to about 55 wt. % of at least one deicing agent; and (c) from 0.01 to about 25 wt. % of at least one additive selected from the group consisting of ionic liquids, deep eutectic solvents, dispersants and combinations thereof.

In another embodiment, the present disclosure is directed to a method for preventing ice formation on a surface. The method comprises: (i) applying an ice melting composition to the surface before ice forms, wherein the ice melting composition comprises: (a) at least one solvent; (b) from 0.01 to about 55 wt. % of at least one deicing agent; and (c) from 0.01 to about 25 wt. % of at least one additive selected from the group consisting of ionic liquids, deep eutectic solvents, dispersants and combinations thereof.

DETAILED DESCRIPTION OF THE DISCLOSURE

Freezing point depression is the decrease of the freezing point of a solvent (e.g., a liquid) upon addition of a non-volatile solute (e.g., a solid) and is calculated as follows:

$$\Delta T = i \cdot K_f \cdot m$$

where $\Delta T$ is the change in freezing point of the temperature of the solvent (° C. or K), i is the van' t Hoff factor (number of ion particles per individual molecule of a solute), $K_f$ is the cryoscopic constant for the solvent (1.853 K·kg/mol for water—the most common solvent for ice melting compositions), and m is the molality of the solute expressed in moles of solute per kg solvent (mol/kg). As such, increasing either the van' t Hoff factor or the molality of the solute will increase the ΔT which lowers the freezing point of the solvent. A lower freezing point in the solvent extends the temperature range for which an ice melting composition is useful. Because the van' t Hoff factor for a solute and the $K_f$ for a solvent cannot be changed, the focus for improving ice melting compositions is on the concentration (i.e., the molality) of the dissolved solute.

For ice melting compositions applied as solutions, the deicing agent(s) should remain dissolved in solution such that the solution may be easily sprayed or otherwise applied to roadways and other surfaces. As the concentration of deicing agents increases in the solution, the freezing point of the solvent (generally water) lowers. As the temperature decreases, the solubility of the dissolved deicing agent also decreases. This means that less deicing agent dissolves in the solvent when higher concentrations are most desirable.

The saturation point is where a maximum amount of solute is dissolved in a solvent (a saturated solution). A solution is unsaturated if less than the maximum solute is dissolved in a solvent and supersaturated if more than the maximum solute is dissolved. Because solubility is often inversely related to temperature, supersaturated solutions are created by preparing a saturated solution and then lowering the temperature. This then leads to precipitation of the solute. As such, lowering the temperature of a solution also lowers the saturation point.

If the temperature of an ice melting composition drops below a certain value, a supersaturated solution may result; this may lead to undesirable precipitation of the deicing agent. If this occurs in the tank or spray nozzle, clogging issues may arise. Equipment may be damaged and time must be expended to unclog or repair the equipment.

The present disclosure is directed to an improved ice melting composition that has an increased concentration of dissolved solutes in a solvent and exhibits reduced precipitation as the temperature decreases. This extends the temperature range in which the ice melting composition is useful and permits the use of more concentrated (therefore more effective) ice melting compositions. These solutions can be used on surfaces were ice has already formed or may be applied prophylactically prior to ice formation. For example, the ice melting solution can be applied to a roadway in advance of a storm in order to reduce or prevent ice formation on the road. This improves driver safety on the roadway. Additionally, it reduces the amount of ice and water absorbed into the void spaces of the roadway. When water gets into a void space and freezes, it expands and may cause damage to a roadway. This leads to potholes which can damage vehicles and require expensive patching.

In one embodiment, the ice melting composition comprises at least one solvent, from 0.01 to 55 wt. % of at least one deicing agent, and from 0.01 to 25 wt. % of at least one additive selected from the group consisting of ionic liquids, deep eutectic solvents, dispersants and combinations thereof.

As used herein, the term "solvent" refers to traditional aqueous and organic solvents. Examples of solvents disclosed herein include, but are not limited to acetic acid, acetone, acetonitrile, benzene, n-butanol, s-butanol, t-butanol, 2-butanone, carbon tetrachloride, chlorobenzene, chloroform, cyclohexane, cyclopentane, 1,2-dichloroethane, dichloromethane, diethyl ether, diethylene glycol, diglyme, dimethylformamide, dimethyl sulfoxide, 1,4-dioxane, ethanol, ethyl acetate, formic acid, glyme, heptane, hexamethylphosphoramide, hexamethylphosphorus triamide, hexane, isopropanol, methanol, methyl t-butyl ether, nitromethane, pentane, petroleum ether, propanol, propylene carbonate, pyridine, sulfolane, tetrahydrofuran, toluene, water, m-xylene, o-xylene, p-xylene, and combinations thereof. In some embodiments the at least one solvent is water. In yet another embodiment, the at least one solvent is a combination of water and an alcohol, for example ethanol, methanol, propanol or isopropanol. In embodiments with two solvents, the ratio (volume/volume) of the two solvents is from 100:1 to 1:1 and all possible ratios in between. In some aspects the ratio (v/v) is about 75:1, about 50:1, about 45:1, about 40:1, about 35:1, about 30:1, about 25:1, about 20:1, about 15:1, about 10:1, about 9:1, about 8:1, about 7:1, about 6:1, about 5:1, about 4:1, about 3:1, about 2:1 or about 1:1. As used in this context, "about" means within ±20%. Under this definition, ionic liquids and deep eutectic solvents are excluded. They are classified as additives herein and disclosed separately.

Deicing agents suitable for use in the ice melting compositions described in the various embodiments herein comprise those known in the art. For example, the deicing agent may be selected from the group consisting of sodium chloride, calcium chloride, potassium chloride, magnesium chloride, sodium acetate, calcium acetate, potassium acetate, magnesium acetate, calcium magnesium acetate, ammonium nitrate, ammonium sulfate, sodium formate, potassium formate, calcium formate, magnesium formate, urea, sand, and combinations thereof. Other deicing agents that are equivalent to those listed are included herein for use with the ice melting composition. In some embodiments, the at least one deciding agent is magnesium chloride. In other embodiments, the at least one deicing agent is sodium chloride. In still other embodiments, the at least one deicing agent is calcium magnesium acetate. In some embodiments, two or more deicing agent are used. In embodiments with two deicing agents, the ratio (weight/weight) of the two deicing agents is from 100:1 to 1:1 and all possible ratios in between. In some aspects the ratio (w/w) is about 75:1 about 50:1, about 45:1, about 40:1, about 35:1, about 30:1, about 25:1, about 20:1, about 15:1, about 10:1, about 9:1, about 8:1, about 7:1, about 6:1, about 5:1, about 4:1, about 3:1, about 2:1 or about 1:1. As used in this context, "about" means within ±20%.

As used herein, "ionic liquids" are classified as additives and defined according to Wasserscheid and Keim in Angewandte Chemie, 112, 3926-3945 (2000) which is incorporated by reference for its teaching thereof. Ionic liquids are salts which have a nonmolecular, ionic character and melt at relatively low temperatures. In some aspects an ionic liquid melts at or below 150° C., 140° C., 130° C., 100° C., 80° C., 50° C. or even 25° C. They are liquid at relatively low temperatures and have a relatively low viscosity at such temperatures. Additionally, they are generally nonflammable, noncorrosive and do not have a measurable vapor pressure. Sometimes ionic liquids are referred to as liquid electrolytes, ionic melts, ionic fluids, fused salts, or ionic glasses. AH salts that melt without decomposing (e.g., sodium chloride at 801° C. or 1474° F.) form an ionic liquid; however, only those salts that fit this definition are encompassed herein.

Ionic liquids are made up of positive and negative ions, but are overall electrically neutral. Both the positive ions and the negative ions are predominantly monovalent, but multivalent anions and/or cations, for example ions bearing from 1 to 5, from 1 to 4, from 1 to 3 and or 1 or 2 electrical charges per ion, are possible. The charges can be located on various localized or delocalized regions within one molecule, i.e. in a betaine-like manner, or can be present on separate anions and cations. In some aspects, an ionic liquid is made up of at least one cation and at least one anion.

In some aspects, the ionic liquid has the formula $[A]_n^+ [Y]^{n-}$, where n=1, 2, 3 or 4 and the cation [A] is selected from among quaternary ammonium cations of the formula $[NR^1R^2R^3R]^+$, phosphonium cations of the formula $[PR^1R^2R^3R]^+$, imidazolium cations of the formula

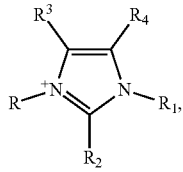

and also all isomeric imidazolinium cations and imidazolidinium cations analogous to the above formula, H-pyrazolium cations of the formula

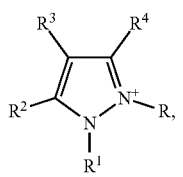

and also 3H-pyrazolium cations, 4H-pyrazolium cations, 1-pyrazolinium cations, 2-pyrazolinium cations and 3-pyrazolinium cations, pyridinium cations of the formula

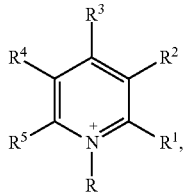

and also pyridazinium, pyrimidinium and pyrazinium ions, pyrrolidinium cations of the formula

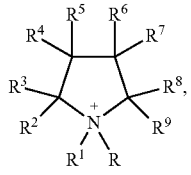

five- to at least six-membered heterocyclic cations containing at least one phosphorus or nitrogen atom and possibly also an oxygen or sulfur atom, for example thiazolium, oxazolium, 1,2,4-triazolium or 1,2,3-triazolium, particularly preferably compounds comprising at least one five- to six-membered heterocycle containing one, two or three nitrogen atoms and a sulfur atom or an oxygen atom, very particularly preferably those having one or two nitrogen atoms, and the 1,8-diazabicyclo[5.4.0]undec-7-enium cation and also the 1,8-diazabicyclo[4.3.0]non-5-enium cation;

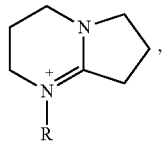

and oligomers and polymers in which these cations are present, where the radicals R, $R^1$, $R^2$, $R^3$, $R^4$, $R^5$, $R^6$, $R^7$, $R^8$ and $R^9$ are each, independently of one another, hydrogen, $C_1$-$C_{18}$-alkyl, $C_2$-$C_{18}$-alkyl which may be interrupted by one or more oxygen and/or sulfur atoms and/or one or more substituted or unsubstituted imino groups, $C_6$-$C_{12}$-aryl, $C_5$-$C_{12}$-cycloalkyl or a five- or six-membered, oxygen-, nitrogen- and/or sulfur-containing heterocycle or two of them together form an unsaturated, saturated or aromatic ring which may be interrupted by one or more oxygen and/or sulfur atoms and/or one or more substituted or unsubstituted imino groups, where the radicals mentioned may each be substituted by functional groups, aryl, alkyl, aryloxy, alkyloxy, halogen, heteroatoms and/or heterocycles.

Here, examples of $C_1$-$C_{18}$-alkyl which may be substituted by functional groups, aryl, alkyl, aryloxy, alkyloxy, halogen, heteroatoms and/or heterocycles are methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hexadecyl, octadecyl, 1,1-dimethyl propyl, 1,1-dimethylbutyl, 1,1,3,3-tetramethylbutyl, benzyl, 1-phenylethyl, 2-phenylethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonylethyl, 2-ethoxycarbonylethyl, 2-butoxycarbonylpropyl, 1,2-di-(methoxycarbonyl)ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, 2-chloroethyl, trichloromethyl, trifluoromethyl, 1,1-dimethyl-2-chloroethyl, 2-methoxyisopropyl, 2-ethoxyethyl, butylthiomethyl, 2-dodecylthioethyl, 2-phenylthioethyl, 2,2,2-trifluoroethyl, 2-hydroxyethyl, 2-hydroxypropyl, 3-hydroxypropyl, 4-hydroxybutyl, 6-hydroxyhexyl, 2-aminoethyl, 2-aminopropyl, 3-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydrhoxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl and 6-ethoxyhexyl.

Examples of $C_2$-$C_{18}$-alkyl interrupted by one or more oxygen atoms and/or sulfur atoms and/or one or more substituted or unsubstituted imino groups are 5-hydroxy-3-oxapentyl, 8-hydroxy-3,6-dioxaoctyl, 11-hydroxy-3,6,9-trioxaundecyl, 7-hydroxy-4-oxa heptyl, 11-hydroxy-4,8-dioxaundecyl, 15-hydroxy-4,8,12-trioxapentadecyl, 9-hydroxy-5-oxanonyl, 14-hydroxy-5,10-oxatetradecyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl and 14-ethoxy-5,10-oxatetradecyl.

If two radicals form a ring, these radicals together can be 1,3-propylene, 1,4-butylene, 2-oxa-1,3-propylene, 1-oxa-1,3-propylene, 2-oxa-1,3-propylene, 1-oxa-1,3-propenylene, 1-aza-1,3-propenylene, 1-$C_1$-$C_4$-alkyl-1-aza-1,3-propenylene, 1,4-buta-1,3-dienylene, 1-aza-1,4-buta-1,3-dienylene or 2-aza-1,4-buta-1,3-dienylene.

The number of oxygen atoms and/or sulfur atoms and/or imino groups is not subject to any restrictions. It is generally not more than 5 per radical, preferably not more than 4 and very particularly preferably not more than 3.

Furthermore, at least one carbon atom, desirably at least two, is/are generally present between two heteroatoms.

Substituted and unsubstituted imino groups can be, for example, imino, methylimino, isopropylimino, n-butylimino or tert-butylimino.

Furthermore, functional groups can be carboxy, carboxamide, hydroxy, di($C_1$-$C_4$-alkyl)-amino, $C_1$-$C_4$-alkyloxycarbonyl, cyano or $C_1$-$C_4$-alkyloxy, $C_6$-$C_{12}$-aryl which may be substituted by functional groups, aryl, alkyl, aryloxy, alkyloxy, halogen, heteroatoms and/or heterocycles, for example phenyl, tolyl, xylyl, α-naphthyl, α-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl or ethoxymethylphenyl, $C_5$-$C_{12}$-cycloalkyl which may be substituted by functional groups, aryl, alkyl, aryloxy, alkyloxy, halogen, heteroatoms and/or heterocycles, for example cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl or a saturated or unsaturated bicyclic system such as norbornyl or norbornenyl, a five- or six-membered, oxygen-, nitrogen- and/or sulfur-containing heterocycle, for example furyl, thienyl, pyrryl, pyridyl, indolyl, benzoxazolyl, dioxolyl, dioxyl, benzimidazolyl, benzthiazolyl, dimethylpyridyl, methylquinolyl, dimethylpyrryl, methoxyfuryl, dimethoxypyridyl, difluoropyridyl, methylthiophenyl, isopropylthiophenyl or tert-butylthiophenyl, and $C_1$-$C_4$-alkyl, for example methyl, ethyl, propyl, isopropyl, n-butyl, sec-butyl or tert-butyl.

In some aspects to R, $R^1$, $R^2$, $R^3$, $R^4$, $R^5$, $R^6$, $R^7$, $R^8$ and $R^9$ each being, independently of one another, hydrogen, methyl, ethyl, n-butyl, 2-hydroxyethyl, 2-cyanoethyl, 2-(methoxycarbonyl)ethyl, 2-(ethoxycarbonyl)ethyl, 2-(n-butoxycarbonyl)ethyl, benzyl, acetyl, dimethylamino, diethylamino or chlorine.

Mixed species, such as $[A^1]^+[A^2]^+[Y]^{2-}$, $[A^1]^+[A^2]^+[A^3]^+[Y]^{3-}$ or $[A^1]^+[A^2]^+[A^3]^+[A^4]^+[Y]^{4-}$ are also encompassed herein, where $A^1$, $A^2$, $A^3$ and $A^4$ are selected independently from among the groups mentioned for [A].

It is also possible to use mixed species having metal cations: $[A^1]^+[A^2]^+[A^3]^+[M^1]^+[Y]^{4-}$, $[A^1]^+[A^2]^+[M^1]^+[M^2]^+[Y]^{4-}$, $[A^1]^+[M^1]^+[M^2]^+[M^3]^+[Y]^{4-}$, $[A^1]^+[A^2]^+[M^1]^+[Y]^{3-}$, $[A^1]^+[M^1]^+[M^2]^+[Y]^{3-}$, $[A^1]^+[M^1]^+[Y]^{2-}$, $[A^1]^+[A^2]^+[M^4]^{2+}[Y]^{4-}$, $[A^1]^+[M^1]^+[M^4]^{2+}[Y]^{4-}$, $[A^1]^+[M^5]^{3+}[Y]^{4-}$, $[A^1]^+[M^4]^{2+}[Y]^{3-}$, where $M^1$, $M^2$, $M^3$ are monovalent metal cations, $M^4$ is a divalent metal cation and $M^5$ is a trivalent metal cation.

As anions, it is in principle possible to use all anions.

The anion [Y] is preferably selected from among: the group of halides or halogen-containing compounds of the formulae: $Cl^-$, $Br^-$, $BF_4^-$, $PF_6^-$, $AlCl_4^-$, $Al_2Cl_7^-$, $FeCl_4^-$, $BCl_4^-$, $SbF_6^-$, $AsF_6^-$, $ZnCl_3^-$, $SnCl_3^-$, $CF_3SO_3^-$, $(CF_3SO_3)_2N^-$, $CF_3CO_2^-$, $CCl_3CO_2^-$, $CN^-$, $SCN^-$, $OCN^-$; the group of sulfates, sulfites and sulfonates of the formula: $SO_4^{2-}$, $HSO_4^-$, $SO_3^{2-}$, $HSO_3^-$, $R^aOSO_3^-$, $R^aSO_3$; the group of phosphates of the formulae: $PO_4^{3-}$, $HPO_4^{2-}$, $H_2PO_4^-$, $R^aPO_4^{2-}$, $HR^aPO_4^-$, $R^aR^bPO_4^-$; the group of phosphonates and phosphinate of the formulae: $R^aHPO_3^-$, $R^aR^bPO_2^-$, $R^aR^bPO_3^-$; the group of phosphites of the formulae: $PO_3^{3-}$, $HPO_3^{2-}$, $H_2PO_3^-$, $R^aPO_3^{2-}$, $R^aHPO_3^-$, $R^aR^bPO_3^-$; the group of phosphonites and phosphinites of the formulae: $R^aR^bPO_2^-$, $R^aHPO_2^-$, $R^aR^bPO^-$, $R^aHPO^-$; the group of carboxylic acids of the formula: $R^aCOO^-$; the group of borates of the formulae: $BO_3^{3-}$, $HBO_3^{2-}$, $H_2BO_3^{31}$, $R^aR^bBO_3^-$, $R^aHBO_3^-$, $R^aBO_3^{2-}$, $R^aR^bR^cR^dB^-$; the group of boronates of the formulae: $R^aBO_2^{2-}$, $R^aR^bBO^-$; the group of carbonates and carboxylic esters of the formulae: $HCO_3^-$, $CO_3^{2-}$, $R^aCO_3^-$; the group of silicates and silicic esters of the formulae: $SiO_4^{4-}$, $HSiO_4^{3-}$, $H_2SiO_4^{2-}$, $H_3SiO_4^-$, $R^aSiO_4^{3-}$, $R^aR^bSiO_4^{2-}$, $R^aR^bR^cSiO_4^-$, $HR^aSiO_4^{2-}$, $H_2R^aSiO_4^-$, $HR^aR^bSiO_4^-$; the group of alkylsilane and arylsilane salts of the formulae: $R^aSiO_3^{3-}$, $R^aR^bSiO_2^{2-}$, $R^aR^bR^cSiO^-$, $R^aR^bR^cSiO_3^-$, $R^aR^bR^cSiO_2^-$, $R^aR^bSiO_3^{2-}$; the group of carboximides, bis(sulfonyl)imides and sulfonylimides of the formulae:

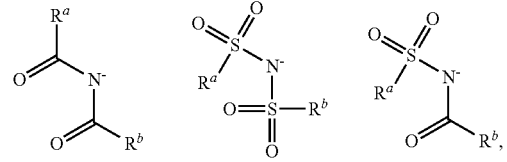

the group of alkoxides and aryloxides of the formula: $R^aO^-$ the group of complex metal ions such as $Fe(CN)_6^{3-}$, $Fe(CN)_6^{4-}$, $MnO_4^-$, $Fe(CO)_4^-$, where the radicals $R^a$, $R^b$, $R^c$, $R^d$ are each, independently of one another, $C_1$-$C_{18}$-alkyl, $C_2$-$C_{18}$-alkyl which may be interrupted by one or more oxygen atoms and/or sulfur atoms and/or one or more substituted or unsubstituted imino groups, $C_6$-$C_{12}$-aryl, $C_5$-$C_{12}$-cycloalkyl or a five- or six-membered, oxygen-, nitrogen- and/or sulfur-containing heterocycle or two of them together form an unsaturated, saturated or aromatic ring which may be interrupted by one or more oxygen and/or sulfur atoms and/or one or more substituted or unsubstituted imino groups, where the radicals mentioned may each be substituted by functional groups, aryl, alkyl, aryloxy, alkyloxy, halogen, heteroatoms and/or heterocycles.

Examples of $C_1$-$C_{18}$-alkyl which may be substituted by functional groups, aryl, alkyl, aryloxy, alkyloxy, halogen, heteroatoms and/or heterocycles are methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hexadecyl, octadecyl, 1,1-dimethylpropyl, 1,1-dimethylbutyl, 1,1,3,3-tetramethylbutyl, benzyl, 1-phenylethyl, 2-phenylethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonylethyl, 2-ethoxycarbonylethyl, 2-butoxycarbonylpropyl, 1,2-di-(methoxycarbonyl)ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, 2-chloroethyl, trichloromethyl, trifluoromethyl, 1,1-dimethyl-2-chloroethyl, 2-methoxyisopropyl, 2-ethoxyethyl, butylthiomethyl, 2-dodecylthioethyl, 2-phenylthioethyl, 2,2,2-trifluoroethyl, 2-hydroxyethyl, 2-hydroxypropyl, 3-hydroxypropyl, 4-hydroxybutyl, 6-hydroxyhexyl, 2-aminoethyl, 2-aminopropyl, 3-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl and 6-ethoxyhexyl.

Examples of $C_2$-$C_{18}$-alkyl interrupted by one or more oxygen atoms and/or sulfur atoms and/or one or more substituted or unsubstituted imino groups are 5-hydroxy-3-oxapentyl, 8-hydroxy-3,6-dioxaoctyl, 11-hydroxy-3,6,9-trioxaundecyl, 7-hydroxy-4-oxaheptyl, 11-hydroxy-4,8-dioxaundecyl, 15-hydroxy-4,8,12-trioxapentadecyl, 9-hydroxy-5-oxanonyl, 14-hydroxy-5,10-oxatetradecyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl and 14-ethoxy-5,10-oxatetradecyl.

If two radicals form a ring, these radicals together can be 1,3-propylene, 1,4-butylene, 2-oxa-1,3-propylene, 1-oxa-1,3-propylene, 2-oxa-1,3-propylene, 1-oxa-1,3-propenylene, 1-aza-1,3-propenylene, 1-$C_1$-$C_4$-alkyl-1-aza-1,3-propenylene, 1,4-buta-1,3-dienylene, 1-aza-1,4-buta-1,3-dienylene or 2-aza-1,4-buta-1,3-dienylene.

The number of oxygen atoms and/or sulfur atoms and/or imino groups is not subject to any restrictions. It is generally not more than 5 per radical, preferably not more than 4 and very particularly preferably not more than 3.

Furthermore, at least one carbon atom, preferably at least two, is/are generally present between two heteroatoms.

Substituted and unsubstituted imino groups can be, for example, imino, methylimino, isopropylimino, n-butylimino or tert-butylimino.

Furthermore, functional groups can be carboxy, carboxamide, hydroxy, di($C_1$-$C_4$-alkyl) amino, $C_1$-$C_4$-alkyloxycarbonyl, cyano or $C_1$-$C_4$-alkyloxy, $C_6$-$C_{12}$-aryl which may be substituted by functional groups, aryl, alkyl, aryloxy, alkyloxy, halogen, heteroatoms and/or heterocycles, for example phenyl, tolyl, xylyl, α-naphthyl, α-naphthyl, 4-diphenylyl, chlorophenyl, dichlorophenyl, trichlorophenyl, difluorophenyl, methylphenyl, dimethylphenyl, trimethyl phenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl or ethoxymethylphenyl, $C_5$-$C_{12}$-cycloalkyl which may be substituted by functional groups, aryl, alkyl, aryloxy, alkyloxy, halogen, heteroatoms and/or heterocycles, for example cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, meth oxycyclohexyl, dimethoxycyclohexyl, diethoxycyclohexyl, butylthiocyclohexyl, chlorocyclohexyl, dichlorocyclohexyl, dichlorocyclopentyl or a saturated or unsaturated bicyclic system such as norbornyl or norbornenyl, a five- or six-membered, oxygen-, nitrogen- and/or sulfur-containing heterocycle, for example furyl, thienyl, pyrryl, pyridyl, indolyl, benzoxazolyl, dioxolyl, dioxyl, benzimidazolyl, benzthiazolyl, dimethylpyridyl, methylquinolyl, dimethyl pyrryl, methoxyfuryl, dimethoxypyridyl, difluoropyridyl, methylthiophenyl, isopropylthiophenyl or tert-butylthiophenyl, and $C_1$-$C_4$-alkyl, for example methyl, ethyl, propyl, isopropyl, n-butyl, sec-butyl or tert-butyl.

In some aspects, $R^1$, $R^2$, $R^3$, $R^4$ and $R^5$ are each independently of one another, hydrogen, methyl, ethyl, n-butyl, 2-hydroxyethyl, 2-cyanoethyl, 2-(methoxycarbonyl)ethyl, 2-(ethoxycarbonyl)ethyl, 2-(n-butoxycarbonyl)ethyl, dimethylamino, diethylamino or chlorine.

In some aspects, ionic liquids are noncorrosive or have a passivating action. These include, in particular, ionic liquids having sulfate, phosphate, borate or silicate anions. Solutions of inorganic salts in ionic liquids and metal-cation-containing ionic liquids of the type $[A^1]^+[M^1]^+[Y]^{2-}$, which give improved thermal stability of the ionic liquid, are particularly preferred. Alkali metals and alkaline earth metals or their salts are very particularly preferred.

In some aspects, ionic liquids have an imidazolium cation, a pyridinium cation or a phosphonium cation. Specific examples of ionic liquids include, but are not limited to, 4-(2-hydroxy-propyl)-1-methyl-4H-imidazolium hexafluorophosphate, 3-methyl-1-(propan-2-ol)-imidazolium hexafluorophosphate, 3-methyl-1-(propan-2-ol)-imidazolium chloride, 3-methyl-1-(propan-2-ol)-imidazolium nitrate, 3-methyl-1-(ethoxyethoxy)-imidazolium hexafluorophosphate, 3-hexyl-1-(2-diethylphosphonato-ethyl)-imidazolium tetrafluoroborate, 3-hexyl-1-(3-diethyl phosphonato-propyl)-imidazolium tetrafluoroborate, 3-octyl-1-(2-diethylphosphonato-ethyl)-imidazolium tetrafluoroborate, 3-methyl-1-butyl-imidazolium tetrafluoroborate, 3-methyl-1-butyl-imidazolium chloride, 3-methyl-1-butyl-imidazolium octyl sulfate, 3-methyl-1-butyl-imidazolium fluorohydrogenate, 3-methyl-1-ethyl-imidazolium tricyanomethane, 3-methyl-1-ethyl-imidazolium fluorohydrogenate, 3-methyl-1-ethyl-imidazolium carborane, 3-methyl-1-ethyl-imidazolium methylcarborane, 3-methyl-1-ethyl-imidazolium ethyl carborane, 3-methyl-1-methyl-imidazolium fluorohydrogenate, 3-methyl-1-propyl-imidazolium fluorohydrogenate, 3-methyl-1-pentyl-imidazolium fluorohydrogenate, 3-methyl-1-hexyl-imidazolium fluorohydrogenate, 3-methyl-1-hexyl-imidazolium chloride, 3-methyl-1-octyl-imidazolium chloride, 3-methyl-1-octyl-imidazolium tetrafluoroborate, 3-methyl-1-methyl-imidazolium tetrafluoroborate, 3-methyl-2-ethyl-1-methyl-imidazolium carborate, tetraethylammonium tributyoctylborate, tetraethylammonium acetate, hexyl-triethyl-ammonium hexyl-triethylborate, hexyl-triethyl-ammonium tributyoctylborate, tetrapropylammonium tripropylhexylborate, tetrabutylammonium tributyhexylborate, hexyl-tri-butylammonium tributylhexylborate, hexyl-tri-butylammonium bis-trifluoromethanesulfonamide, heptyl-tri-butylammonium bis-trifluoromethanesulfonamide, tetrapentylammonium bis-trifluoromethanesulfonamide, octyl-tri-butylammonium bis-trifluoromethanesulfonamide, octyl-tri-butylammonium trifluoromethylsulfonate, tetrahexylammonium bis-trifluoromethanesulfonamide, tetrahexylammonium tributyhexylborate, tetraheptylammonium bis-trifluoromethanesulfonamide, tetraoctylammonium bis-trifluoromethanesulfonamide, tetradodecylammonium bis-trifluoromethanesulfonamide, N-methyl-N-propylpyrrolidine dicyanimide, N-methyl-N-butylpyrrolidine dicyanimide, N-methyl-N-hexylpyrrolidine dicyanimide, [bis-(N-butyl-N-ethyl-amino)-methylene]-dimethyl-ammonium tetrafluoroborate, [bis-(N-hexyl-N-hexyl-amino)-methylene]-dimethyl-ammonium tetrafluoroborate, [bis-(N-hexyl-N-hexyl-amino)-methylene]-dimethyl-ammonium hexafluorophosphate, [bis-(N-hexyl-N-hexyl-amino)-methylene]-dimethyl-ammonium chloride, [bis-(N-hexyl-N-hexyl-amino)-methylene]-dimethyl-ammonium bis-trifluoromethanesulfonamide, [bis-(N-octyl-N-octyl-amino)-methylene]-dimethyl-ammonium tetrafluoroborate, [bis-(N-octyl-N-octyl-amino)-methylene]-dimethyl-ammonium hexafluorophosphate, [bis-(N-octyl-N-octyl-amino)-methylene]-dimethyl ammonium chloride, methyl-tripropylphosphonium tosylate, methyl-tri-(iso-butyl)phosphonium tosylate, methyl-tri-(tert-butyl)phosphonium tosylate, methyl-di-(iso-butyl)-octylphosphonium tosylate, methyl-di-(iso-butyl)-tetradecylphosphonium tosylate, tetradecyl-tri-(hexyl)-phosphonium bromide, tetradecyl-tri-(hexyl)-phosphonium tetrafluoroborate, tetradecyl-tri-(hexyl)-phosphonium hexafluorophosphate, octylimidazolium salicylate, nonylimidazolium salicylate, dodecylimidazolium salicylate, (butyoxymethyl)imidazolium salicylate, 1-ethyl-3-methylimidazolium tetrafluoroborate, 1-butyl-3-methylimidazolium tetrafluoroborate, 1-hexyl-3-methylimidazolium tetrafluoroborate, 1-methyl-3-octylimidazolium tetrafluoroborate, 1-butylpyridinium tetrafluoroborate, 1-butyl-3-methylpyridinium tetrafluoroborate, 1-butyl-4-methylpyridinium tetrafluoroborate, 1-butyl-3-methylimidazolium hexafluorophosphate, 1-hexyl-3-methylimidazolium hexafluorophosphate, 1-methyl-3-octylimidazolium, 1-butylpyridinium hexafluorophosphate, 1-butyl-3-methylpyridinium hexafluorophosphate, 1-butyl-4-methylpyridinium hexafluorophosphate, 1-ethyl-3-methylimidazolium diethylphosphate, 1,3-dimethylimidazolium dimethylphosphate, choline dihydrogenphosphate, 1-ethyl-3-methylimidazolium ethylsulfate, 1-ethyl-3-methylimidazolium hydrogensulfate, 1-ethyl-3-methylimidazolium acetate, ethylammonium nitrate, Triethylsulfonium bis(trifluoromethylsulfonyl)imide, methyltrioctylammonium bis(trifluoromethylsulfonyl)imide, 1-ethyl-3-methylimidazolium bis(trifluoromethylsulfonyl)imide, 1-methyl-3-propylimidazolium bis(trifluoromethylsulfonyl)imide, 1,2-dimethyl-3-propylimidazolium bis(trifluoromethylsulfonyl)imide, 1-butyl-3-methylimidazolium bis(trifluoromethylsulfonyl)imide, 1-butyl-2,3-dimethylimidazolium bis(trifluoromethylsulfonyl)imide, 1-hexyl-3-methylimidazolium bis(trifluoromethylsulfonyl)imide, 1-Hexadecyl-3-methylimidazolium bis(trifluoromethylsulfonyl)imide, 1-allyl-3-methylimidazolium bis(trifluoromethylsulfonyl)imide, 1-methyl-1-propylpyrrolidinium bis(trifluoromethylsulfonyl)imide, 1-butyl-1-methylpyrrolidinium bis(trifluoromethylsulfonyl)imide, 1-methyl-1-propylpiperidinium bis(trifluoromethylsulfonyl)imide, 1-butylpyridinium bis(trifluoromethylsulfonyl)imide, 1-butyl-3-methylpyridinium bis(trifluoromethylsulfonyl)imide, 1-butyl-4-methylpyridinium bis(trifluoromethylsulfonyl)imide, trihexyltetradecylphosphonium bis(trifluoromethylsulfonyl)imide, 1-ethyl-3-methylimidazolium triflate,1-butyl-3-methylimidazolium triflate, 1-hexyl-3-methylimidazolium triflate, 1-methyl-3-octylimidazolium triflate, 1-butyl-1-methylpyrrolidinium triflate, 1-ethyl-3-methylimidazolium thiocyanate, 1-ethyl-3-methylimidazolium dicyanamide,1-butyl-3-methylimidazolium dicyanamide, 1-butyl-1-methylpyrrolidinium dicyanamide, 1-ethyl-3-methylimidazolium chloride, 1-butyl-3-methylimidazolium chloride, 1-allyl-3-methylimidazolium chloride, trihexyltetradecylphosphonium chloride, 1-ethyl-3-methylimidazolium bromide, 1-butyl-3-methylimidazolium bromide, 1,3-dimethylimidazolium iodide, 1-ethyl-3-methylimidazolium iodide, 1-methyl-3-propylimidazolium iodide, 1-butyl-3-methylimidazolium iodide, 1-hexyl-3-methylimidazolium iodide, 1-allyl-3-methylimidazolium iodide, (tris-2-hydroxyethyl)methylammonium methylsulfate, 1-ethyl-3-methylimidazolium acetate, and combinations thereof. In some aspects, the at least one ionic liquid is (tris-2-hydroxyethyl)methylammonium methylsulfate and/or 1-ethyl-3-methylimidazolium acetate. In some embodiments, the at least one ionic liquid is 1-ethyl-3-methylimidazolium acetate. In some embodiments, the at least one ionic liquid is (tris-2-hydroxyethyl)methylammonium methylsulfate.

In yet another aspect, two or more ionic liquids are used. In embodiments with two ionic liquids, the ratio (volume/volume) of the two ionic liquids is from 100:1 to 1:1 and all possible ratios in between. In some aspects the ratio (v/v) is about 75:1, about 50:1, about 45:1, about 40:1, about 35:1, about 30:1, about 25:1, about 20:1, about 15:1, about 10:1, about 9:1, about 8:1, about 7:1, about 6:1, about 5:1, about 4:1, about 3:1, about 2:1 or about 1:1. As used in this context, "about" means ±20%.

In some aspects the concentration of the at least one ionic liquid is from 0.01 to 25 wt. % of the ice melting composition. In some aspects, the concentration of the ionic liquid is from 0.02 to 20 wt. %, from 0.05 to 10 wt. %, from 0.1 to 5 wt. %, from 1.0 to 7.0 wt. %, from 2.5 to 4.5 wt. %, or from 3.0 to 4.0 wt. %.

In yet another aspect, the concentration of the ionic liquid is about 0.02 wt. %, about 0.03 wt. %, about 0.05 wt. %, about 0.1 wt. %, about 0.5 wt. %, about 1.0 wt. %, about 1.5 wt. %, about 2.0 wt. %, about 2.5 wt. %, about 3.0 wt. %, about 3.5 wt. %, about 4.0 wt. %, about 5.0 wt. %, about 7.5 wt. %, about 10.0 wt. %, about 15 wt. %, or about 20 wt. % of the ice melting composition. As used in this context, "about" means ±0.5 wt. %. If two or more ionic liquids are used, the weight percentage refers to the combined weight of the two or more ionic liquids.

As used herein, "deep eutectic solvents" (DES) are classified as additives and are defined according to Smith, Abbott and Ryder in *Chemical Reviews*, 114, 11060 (2014) which is incorporated by reference for its teaching thereof. A DES contains large, non-symmetric ions that have a low lattice energy and a low melting point. They are frequently a complex of a quaternary ammonium salt with either a metal salt or hydrogen bond donor. There are four general types of DESs based on the nature of the complexing agent incorporated therein. A Type I DES is formed from $MCl_x$ and a quaternary ammonium salt where M is a metal. A Type II DES is formed from a hydrated metal halide and choline chloride. A Type III DES is formed from choline chloride and hydrogen bond donors. A Type IV DES incorporates a mixture of metal halides and urea. A key feature of a DES is that the melting point of the combination of the two or more components is much lower than each of the individual components. In some aspects herein, the DES is Type I. In some aspects herein, the DES is Type II. In some aspects herein, the DES is Type III. In some aspects herein, the DES is Type IV.

Examples of salts and hydrogen bond donors used to make DESs include, but are not limited to, methyltriphenylphosphonium bromide, zinc chloride, urea, thiourea, 1-methyl urea, 1,3-dimethyl urea, 1,1-dimethyl urea, acetamide, banzamide, choline chloride, ethylene glycol, glycerol, glycol, adipic acid, benzoic acid, citric acid, malonic acid, oxalic acid, phenylacetic acid, phenylpropionic acid, tricarballylic acid, magnesium chloride dehydrate, 2,2,2-trifluoroacetamide, hexanediol, aluminum chloride, chromium chloride hexahydrate, and ethanol. In some aspects, the DES comprises choline chloride and glycol. In a DES where two separate molecules are combined, the ratio (weight/weight) of the two molecules is such that the combination exhibits the properties of a DES as described herein. In some aspects the ratio is from 100:1 to 1:1 and all possible ratios in between. In some aspects the ratio (w/w) is about 75:1, about 50:1, about 45:1, about 40:1, about 35:1, about 30:1, about 25:1, about 20:1, about 15:1, about 10:1, about 9:1, about 8:1, about 7:1, about 6:1, about 5:1, about 4:1, about 3:1, about 2:1 or about 1:1. As used in this context, "about" means ±0.5 wt. %. If two or more DESs are used, the weight percentage refers to the combined weight of the two or more DESs. In some aspects, the DES is a 1:1 mixture of choline chloride and glycol.

In some aspects of the ice melting composition, two or more additives are used. The two or more additives can be in any combination of the ionic liquids, DESs and dispersants. By way of example and not limitation, the ice melting composition may comprise two different ionic liquids; it may comprise two different DESs; it may comprise one ionic liquid and one DES; it may comprise one ionic liquid and one dispersant; it may comprise one dispersant and one DES; it may comprise two dispersants; it may comprise one ionic liquid, one DES and one dispersant; it may comprise one ionic liquid and two dispersants. In compositions with two or more additives, each additive independently of the any other present may comprise from about 0.01 to 25.0 wt. % of the ice melting composition.

The higher the concentration of the deicing agent(s) in the solvent (i.e., higher molality), the lower the freezing point of the solvent. This permits the ice melting composition to be used in low temperature environments. In some aspects the concentration of the deicing agent is from 0.01 to 55 wt. % of the ice melting composition. In some aspects, the concentration of the deicing agent is from 1 to 45 wt. %, from 5 to 40 wt. %, from 10 to 35 wt. %, from 25 to 35 wt. %, or from 28 to 32 wt. %. In yet another aspect, the concentration of the deicing agent is about 2 wt. %, about 3 wt. %, about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, or about 55 wt. %. As used in this context, "about" means ±2.5 wt. %. If two or more deicing agents are used, the weight percentage refers to the combined weight of the two or more deicing agents.

Dispersants are added to ice melting compositions to lower the freezing point, increase the saturation point of the deicing agent, inhibit precipitation of dissolved solids, and/or to improve the application or spraying thereof. In yet another aspect, the ice melting composition comprises from 0.01 to 25.0 wt. % of at least one dispersant. In some aspects, the ice melting composition comprises from 0.001 to 20.0 wt. % of at least one dispersant. In some aspects, the dispersant is present without any additional additives. In yet other aspects, the dispersant is present with one or more additional additives as disclosed elsewhere herein.

In some aspects, the at least one dispersant is selected from the group consisting of water-soluble polymers, poly (alkylene) glycol, (poly)propylene glycol, (poly)ethylene glycol, propylene glycol, ethylene glycol, polyacrylates, polyvinylpyrrolidone and combinations thereof. In other aspects, the at least one dispersant is selected from the group consisting of water-soluble polymers, poly(alkylene) glycol, (poly)propylene glycol, (poly)ethylene glycol, propylene glycol, ethylene glycol, and combinations thereof. In some aspects, the at least one dispersant is (poly)propylene glycol. In some aspects, the at least one dispersant is (poly)ethylene glycol. In some aspects, the at least one dispersant is propylene glycol. In some aspects, the at least one dispersant is ethylene glycol. In yet another aspect, the at least one dispersant is a water-soluble polymer. In yet another aspect, the dispersant is a poly(alkylene) glycol selected from the group consisting of (poly)ethylene glycol, (poly)propylene glycol, (poly)butylene glycol, (poly)tetramethylene glycol, and combinations thereof.

In still yet another aspect, two or more dispersants are used in the ice melting composition. In embodiments with two dispersants, the ratio (weight/weight) of the two dispersants is from 100:1 to 1:1 and all possible ratios in between. In some aspects the ratio (w/w) is about 75:1, about 50:1, about 45:1, about 40:1, about 35:1, about 30:1, about 25:1, about 20:1, about 15:1, about 10:1, about 9:1, about 8:1, about 7:1, about 6:1, about 5:1, about 4:1, about 3:1, about 2:1, or about 1:1. As used in this context, "about" means ±20%.

In yet another aspect, the dispersant comprises about 0.001 wt. %, about 0.005 wt. %, about 0.01 wt. %, about 0.02 wt. %, about 0.03 wt. %, about 0.04 wt. %, about 0.05 wt. %, about 0.08 wt. %, about 0.1 wt. %, about 0.5 wt. %, about 1.0 wt. %, about 1.5 wt. %, about 2.0 wt. %, about 2.5 wt. %, about 3.0 wt. %, about 3.5 wt. %, about 4.0 wt. %, about 5.0 wt. %, about 7.5 wt. %, about 10.0 wt. %, about 15. wt. %, about 20 wt. %, or about 25 wt. % of the ice melting composition. As used in this context, "about" means ±1.0 wt. %. If two or more dispersants are used, the weight percentage refers to the combined weight of the two or more dispersants.

If the at least one dispersant comprises a polymer, each polymer independent of the any other polymer present has a weight average molecular weight of from 300 to 10,000. In yet another aspect, the weight average molecular weight is about 300, about 500, about 1,000, about 1,500, about 2,000, about 2,500, about 3,000, about 3,500, about 4,000, about 4,500, about 5,000, about 5,500, about 6,000, about 6,500, about 7,000, about 7,500, about 8,000, about 8,500, about 9,000, about 9,500, or about 10,000. As used in this context, "about" means ±250 amu.

Without being bound by a specific theory, it is believed that the inclusion of an ionic liquid, a deep eutectic solvent, a dispersant or a combination thereof in the ice melting composition either increases the saturation point of a solute, inhibits nucleation of a solute during crystallization, or both. Regardless of the cause, the result is that more solute remains in solution for a longer period of time at a given temperature before precipitation or crystallization occurs. As such, the addition of an ionic liquid, a deep eutectic solvent, a dispersant or a combination thereof permits an increased molality of the dissolved solutes in the ice melting composition. This increases the AT in the freezing point depression equation which lowers the freezing point of the solvent. Additionally, it reduces or prevents precipitation of the deicing agent and any associated impurities. The terms "precipitation" and "crystallization" are used interchangeably herein. For either term, it means the formation of an insoluble solid from a solution.

Because the solvent in the ice melting composition has dissolved solids therein, in some aspects, the freezing point of ice melting composition is lower than the freezing point of the pure solvent. In embodiments where the solvent is water, the freezing point of the ice melting composition is below 0° C., below −2° C., below −4° C., below −6° C., below −8° C., below −10° C., below −12° C., below −14° C., below −16° C., below −18° C., below −20° C., below −22° C., below −25° C., below −30° C., or even below −40° C.

In yet another aspect, the saturation point of the ice melting composition is increased when compared to the same composition without the addition of the at least one additive. By way of example and not limitation, the saturation point of the ice melting composition is compared to the same composition with the at least one additive removed. A change in the saturation point for a solvent/solute combination can be determined in two ways: concentration change or temperature change.

For a determination of the saturation point based on concentration, it means that the amount of solute that dissolves in a solvent increases at a specific temperature where the temperature remains constant. By way of example and not limitation, if a maximum of 20 g of solute dissolves in 100 g of solvent at 0° C. (a saturated solution), then an increased saturation point means that more than 20 g (e.g., 25 g) of the same solute would dissolve in 100 g of the same solvent at the same temperature. The magnitude of the change depends on the nature and amount of the additive.

For a determination of the saturation point based on temperature, it means that the temperature at which a specific amount of solute dissolves decreases for a specific concentration. This takes advantage of the fact that solubility is inversely related to temperature for most solutes that are solid at ambient temperature. By way of example and not limitation, if a maximum of 20 g of solute will dissolve in 100 g of a solvent at 25° C. (a saturated solution), then the same amount of solute (20 g) will dissolve in the same amount of solvent (100 g) at a lower temperature (e.g., 0° C.). The magnitude of the change depends on the nature and amount of the additive. Therefore, an "increased saturation point" refers to either a higher concentration of solute at a specific temperature or a lower temperature at one concentration of solute when compared to the same composition without the inclusion of at least one additive.

In some aspects disclosed herein, the ice melting composition exhibits an increased saturation point when compared to the same composition without at least one additive. In some aspects the increased saturation point (temperature based determination) is at least 1° C. lower, at least 2° C. lower, at least 3° C. lower, at least 5° C. lower, at least 7° C. lower, at least 10° C. lower, at least 12° C. lower, at least 15° C. lower, at least 20° C. lower or even at least 25° C. lower. In some aspects disclosed herein, the ice melting composition exhibits an increased saturation point (concentration based determination, measured as either wt. % or molality) where the amount of solute dissolved at a specific temperature in 5% higher, 10% higher, 15% higher, 20% higher, 25% higher, 30% higher, 40% higher, 50% higher, 60% higher, 70% higher, 80% higher, 90% higher or 100% higher.

Also disclosed herein is a method for melting ice on a surface. The method comprises applying an ice melting composition to a surface where ice has already formed. The ice melting composition is as described elsewhere herein.

In some aspects, applying the ice melting composition to a surface is done by spraying. Spraying can be from any type of spraying apparatus, including, but not limited to, a handheld sprayer, a backpack sprayer or a vehicle mounted sprayer. The sprayer may have one or a plurality of spray nozzles by which to apply the ice melting composition to the surface. In yet another aspect, the applying is done by pouring the ice melting composition onto the surface.

This method can be applied to any surface where ice has already formed. Examples of surfaces include, but are not limited to, a building, a roof, gutters, the interior or exterior of a pipe, non-porous asphalt road, an asphalt road, a porous asphalt road, a concrete road, a bituminous road, a brick road, a graveled path, a cobbled road, an unpaved road, a bridge, a highway overpass, pavement, a window, a sidewalk, a walkway, a paved path, a runway, an airplane, an automobile, a truck, a vehicle and a vehicle windshield.

Also disclosed herein is a method for preventing ice formation on a surface. The method comprises applying an ice melting composition to a surface before ice forms. The ice melting composition is as described elsewhere herein.

In some aspects, applying the ice melting composition to a surface is done by spraying. Spraying can be from any type of spraying apparatus, including, but not limited to, a handheld sprayer, a backpack sprayer or a vehicle mounted sprayer. The sprayer may have one or a plurality of spray nozzles by which to apply the ice melting composition to the surface. In yet another aspect, the applying is done by pouring the ice melting composition onto the surface.

This method can be applied to any surface in order to prevent ice from forming. Examples of surfaces include, but are not limited to, a building, a roof, gutters, the interior or exterior of a pipe, non-porous asphalt road, an asphalt road, a porous asphalt road, a concrete road, a bituminous road, a brick road, a graveled path, a cobbled road, an unpaved road, a bridge, a highway overpass, pavement, a window, a sidewalk, a walkway, a paved path, a runway, an airplane, an automobile, a truck, a vehicle and a vehicle windshield.

EXAMPLES

Examples of the ice melting compositions disclosed herein were prepared, and the amount of precipitation was determined.

Example 1 High Concentrations of an Ionic Liquid

In an Imhoff cone, EFKA IO 6783 ((tris-2-hydroxyethyl) methylammonium methylsulfate) was added to 1.0 L of a 30 wt. % $MgCl_2$ solution and mixed until homogeneous. After 48 hrs. at −17.8° C. (0° F.), the precipitate was collected, dried overnight at 80° C. and weighed. The following results were obtained:

| wt. % of EFKA IO 6783 | g $MgCl_2$ collected | wt. % of $MgCl_2$ collected |
|---|---|---|
| 0 (control) | 83.55 | 21.6 |
| 10 | 36.49 | 9.4 |
| 20 | 42.77 | 11.0 |

Example 2 Low Concentration of an Ionic Liquid

Because it would be more cost effective to use the smallest amount of an additive as possible, further tests were performed to determine the usefulness of an ionic liquid at lower concentrations. Similar to Example 1, in a glass jar, EFKA IO 6783 was added to 300 mL of a 30 wt. % $MgCl_2$ solution and kept at −17.8° C. (0° F.) for 24 hrs. The following results were obtained:

| wt. % of EFKA IO 6783 | g $MgCl_2$ collected | wt. % of $MgCl_2$ collected |
|---|---|---|
| 1 | 5.2 | 5.8 |
| 3 | 2.7 | 3.0 |
| 5 | 3.1 | 3.4 |
| 7 | 3.6 | 4.0 |
| 10 | 4.7 | 5.2 |

The same experiments were performed again except on a 10 mL scale, and the following results were obtained:

| wt. % of EFKA IO 6783 | g $MgCl_2$ collected | wt. % of $MgCl_2$ collected |
|---|---|---|
| 2.0 | 0.8671 | 28.9 |
| 2.5 | 0.8342 | 27.8 |
| 3.0 | 0.7939 | 26.5 |
| 3.5 | 0.7436 | 24.8 |
| 4.0 | 0.8833 | 29.4 |

The sample with 3.5 wt. % of the EFKA 10 6783 was then tested using an Imhoff cone with 1 L of $MgCl_2$ solution as described in Example 1 above. In this instance, 41.05 g of $MgCl_2$ was recovered which was 10.6% of the dissolved $MgCl_2$.

Example 3 PEG Dispersant with an Ionic Liquid

Using the same procedure as in Example 2 above, Pluriol® 3350 (pharmaceutical grade PEG having a weight average molecular weight of 3350 amu) was used as the additive either alone or in combination with 3.5 wt. % of either EFKA IO 6783 or Basionics BC 04 (1-ethyl-3-methylimidazolium acetate). The following results were obtained:

| wt. % of Pluriol ® 3350 | wt. % of EFKA IO 6783 | wt. % of Basionics BC04 | g $MgCl_2$ collected | wt. % of $MgCl_2$ collected |
|---|---|---|---|---|
| 0 (control) | 0 | 0 | 0.5256 | 17.5 |
| 0 | 3.5 | 0 | 0.3307 | 11.0 |
| 0 | 0 | 3.5 | 0.2793 | 9.3 |
| 0.02 | 0 | 0 | 0.0545 | 1.8 |
| 0.04 | 0 | 0 | 0.0515 | 1.7 |
| 0.08 | 0 | 0 | 0.0479 | 1.6 |
| 0.02 | 3.5 | 0 | 0.0119 | 0.4 |
| 0.04 | 3.5 | 0 | 0.0214 | 0.7 |
| 0.08 | 3.5 | 0 | 0.0204 | 0.7 |

Results and Discussion

Based on this data, both 1-ethyl-3-methylimidazolium acetate and (tris-2-hydroxyethyl)methylammonium methylsulfate significantly reduced the amount of precipitation observed in the 30 wt. % $MgCl_2$ solution after 48 hours. The addition of a dispersant further reduces precipitation. It should be noted that several of the samples that included only Pluriol 3350 froze solid at −17.8° C. (0° F.) while none of the sample comprising an ionic liquid did. These results also illustrate the importance of a control or standard when comparing different concentrations and time periods. Crystallization is not always a fast process and samples allowed to stand for different time periods may exhibit differing amounts of precipitation.

This written description uses examples to disclose the subject matter herein, including the best mode, and also to enable any person skilled in the art to practice the disclosure, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An ice melting composition comprising:
   at least one solvent selected from the group consisting of acetic acid, acetone, acetonitrile, benzene, n-butanol, s-butanol, t-butanol, 2-butanone, carbon tetrachloride, chlorobenzene, chloroform, cyclohexane, cyclopentane, 1,2-dichloroethane, dichloromethane, diethyl ether, diethylene glycol, diglyme, dimethylformamide, dimethyl sulfoxide, 1,4-dioxane, ethanol, ethyl acetate, formic acid, glyme, heptane, hexamethylphosphoramide, hexamethylphosphorus triamide, hexane, isopropanol, methanol, methyl t-butyl ether, nitromethane, pentane, petroleum ether, propanol, propylene carbonate, pyridine, sulfolane, tetrahydrofuran, toluene, water, m-xylene, o-xylene, p-xylene, and combinations thereof;
   from about 10 to about 35 wt. % of at least one deicing agent selected from the group consisting of magnesium chloride, magnesium acetate, calcium magnesium acetate magnesium formate, and combinations thereof; and
   from 0.01 to about 25 wt. % of at least one additive, wherein the at least one additive comprises at least one ionic liquid selected from the group consisting of (tris-2-hydroxyethyl)methylammonium methylsulfate, 1-ethyl-3-methylimidazolium acetate and combinations thereof.

2. The ice melting composition of claim 1, wherein the composition comprises from 0.1 to 5.0 wt. % of the at least one ionic liquid.

3. The ice melting composition of claim 1, wherein the composition comprises from 25 to 35 wt. % of the at least one deicing agent.

4. The ice melting composition of claim 2, wherein the at least one solvent comprises water.

5. The ice melting composition of claim 1, wherein the at least one additive comprises from 0.01 to 1.0 wt. % of at least one dispersant, wherein the at least one dispersant is selected from the group consisting of poly(alkylene) glycol, (poly)propylene glycol, (poly)ethylene glycol, propylene glycol, ethylene glycol, and combinations thereof.

6. The ice melting composition of claim 5, wherein the composition comprises:
   water;
   about 30 wt. % of magnesium chloride;

about 3.5 wt. % of an ionic liquid selected from the group consisting of (tris-2-hydroxyethyl)methylammonium methyl sulfate, 1-ethyl-3-methylimidazolium acetate and combinations thereof; and from 0.02 to 1.0 wt. % of (poly)ethylene glycol.

7. The ice melting composition of claim 5, wherein the composition comprises:

water;

about 30 wt. % of magnesium chloride; and from 0.02 to 1.0 wt. % of (poly)ethylene glycol.

8. A method for melting ice on a surface, the method comprising:

applying an ice melting composition to the surface after ice has formed; wherein the ice melting composition comprises:

at least one solvent;

from 0.01 to about 55 wt. % of at least one deicing agent; and from 0.01 to about 25 wt. % of at least one additive, wherein the at least one additive comprises at least one ionic liquid selected from the group consisting of (tris-2-hydroxyethyl)methylammonium methylsulfate, 1-ethyl-3-methylimidazolium acetate and combinations thereof.

9. The method of claim 8, wherein the ice melting composition comprises:

about 30 wt. % of magnesium chloride;

about 3.5 wt. % of an ionic liquid selected from the group consisting of (tris-2-hydroxyethyl)methylammonium methylsulfate, 1-ethyl-3-methylimidazolium acetate and combinations thereof; and from 0.02 to about-1.0 wt. % of poly(ethylene) glycol.

10. A method for preventing ice formation on a surface, the method comprising:

applying an ice melting composition to the surface before ice forms;

wherein the ice melting composition comprises:

at least one solvent;

from 0.01 to about 55 wt. % of at least one deicing agent; and from 0.01 to about 25 wt. % of at least one additive, wherein the at least one additive comprises at least one ionic liquid selected from the group consisting of (tris-2-hydroxyethyl)methylammonium methylsulfate, 1-ethyl-3-methylimidazolium acetate and combinations thereof.

11. The method of claim 10, wherein the ice melting composition comprises:

about 30 wt. % of magnesium chloride;

about 3.5 wt. % of an ionic liquid selected from the group consisting of (tris-2-hydroxyethyl)methylammonium methyl sulfate, 1-ethyl-3-methylimidazolium acetate and combinations thereof; and from 0.02 to 1.0 wt. % of poly(ethylene) glycol.

12. The method of claim 10, wherein the surface is selected from the group consisting of a building, a roof, gutters, the interior or exterior of a pipe, non-porous asphalt road, an asphalt road, a porous asphalt road, a concrete road, a bituminous road, a brick road, a graveled path, a cobbled road, an unpaved road, a bridge, a highway overpass, pavement, a window, a sidewalk, a walkway, a paved path, a runway, an airplane, an automobile, a truck, a vehicle and a vehicle windshield.

* * * * *